(12) United States Patent
Miyazaki

(10) Patent No.: US 11,453,245 B2
(45) Date of Patent: Sep. 27, 2022

(54) PNEUMATIC TIRE

(71) Applicant: Toyo Tire Corporation, Itami (JP)

(72) Inventor: Tetsuji Miyazaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 155 days.

(21) Appl. No.: 16/592,004

(22) Filed: Oct. 3, 2019

(65) Prior Publication Data
US 2020/0122515 A1 Apr. 23, 2020

(30) Foreign Application Priority Data

Oct. 22, 2018 (JP) .............................. JP2018-198696

(51) Int. Cl.
B60C 11/12 (2006.01)
B60C 11/03 (2006.01)
B60C 11/13 (2006.01)

(52) U.S. Cl.
CPC ........ *B60C 11/0304* (2013.01); *B60C 11/125* (2013.01); *B60C 11/1259* (2013.01);
(Continued)

(58) Field of Classification Search
CPC ............... B60C 11/1353; B60C 11/125; B60C 11/1281; B60C 11/246; B60C 2011/0367;
(Continued)

(56) References Cited

U.S. PATENT DOCUMENTS 6,415,835 B1 * 7/2002 Heinen ................... B60C 11/13
152/209.21
10,202,007 B2 * 2/2019 Oba ...................... B60C 11/125
(Continued)

FOREIGN PATENT DOCUMENTS

CN 103963572 A 8/2014
CN 107031300 A 8/2017
(Continued)

OTHER PUBLICATIONS

Office Action dated Sep. 3, 2021, issued in counterpart CN Application No. 201910856555.9, with English Translation. (16 pages).
(Continued)

*Primary Examiner* — Robert C Dye
*Assistant Examiner* — Brendon Charles Darby
(74) *Attorney, Agent, or Firm* — WHDA, LLP

(57) ABSTRACT

A tire has a lug that forms a contact patch surface, and a recessed region that extends along a prescribed direction and that is recessed relative to the contact patch surface. The recessed region has a first vertical face that that forms a first edge between the first vertical face and the contact patch surface, and a planar base that extends in a width direction of the recessed region which is perpendicular to the prescribed direction. The planar base has at least two planar regions having mutually different heights and arrayed along the prescribed direction. The recessed region further has a second vertical face that connects the two planar regions and that forms a third edge between the second vertical face and a higher one of the planar regions. The third edge is inclined with respect to both a tire width direction and a tire circumferential direction.

5 Claims, 14 Drawing Sheets

(52) U.S. Cl.
CPC ... *B60C 11/1353* (2013.01); *B60C 2011/0365* (2013.01); *B60C 2011/0367* (2013.01); *B60C 2011/0369* (2013.01); *B60C 2011/0381* (2013.01); *B60C 2011/1361* (2013.01)

(58) Field of Classification Search
CPC ..... B60C 2011/0381; B60C 2011/0369; B60C 2011/1361; B60C 2011/0372
See application file for complete search history.

(56) References Cited

U.S. PATENT DOCUMENTS

| | | | | |
|---|---|---|---|---|
| 2009/0320981 | A1* | 12/2009 | Matsumoto | B60C 11/12 152/209.8 |
| 2013/0186532 | A1* | 7/2013 | Kujime | B60C 11/033 152/209.8 |
| 2014/0216620 | A1 | 8/2014 | Tanaka | |
| 2017/0136827 | A1 | 5/2017 | Sato | |
| 2019/0225029 | A1* | 7/2019 | Nakajima | B60C 11/047 |

FOREIGN PATENT DOCUMENTS

| | | |
|---|---|---|
| JP | H 09-300918 A | 11/1997 |
| JP | 2001-187517 A | 7/2001 |
| JP | 2004-330812 A | 11/2004 |
| JP | 2010-030583 A | 2/2010 |
| JP | 2010-247626 A | 11/2010 |

OTHER PUBLICATIONS

Office Action dated May 24, 2022, issued in counterpart JP Application No. 2018-198696, with English Translation. (6 pages).

* cited by examiner

A1-A1

A2-A2

A1-A1

A1-A1

PNEUMATIC TIRE

BACKGROUND OF THE INVENTION

The present disclosure relates to a pneumatic tire.

It is desired that studless tires, all-season tires, and other such winter tires have improved performance on snowy road surfaces. Among the various performance categories, improvement in performance with respect to traction in snow is desired.

Japanese Patent Application Publication Kokai No. 2001-187517 discloses formation of zigzag-shaped sipes at the base of land portion grooves to improve snow performance and dry performance.

Japanese Patent Application Publication Kokai No. 2004-330812 discloses formation of a widened portion at an opening of a sipe to improve wet performance and suppress uneven wear.

While there is a description in Japanese Patent Application Publication Kokai No. 2001-187517 to the effect that the land portion groove permits attainment of snow traction, new techniques for attainment of snow traction are desired.

SUMMARY OF THE INVENTION

It is an object of the present disclosure to provide a pneumatic tire permitting improvement in performance with respect to traction in snow.

According of the present disclosure, there is provided a pneumatic tire comprising:

a land portion that is partitioned by at least one major groove and that forms a contact patch surface; and a recessed region that extends along a prescribed direction and that is recessed relative to the contact patch surface;

wherein the recessed region has a first vertical face that that forms a first edge between the first vertical face and the contact patch surface, and a base that extends in a width direction of the recessed region which is perpendicular to the prescribed direction;

wherein the base has at least two regions having mutually different heights and arrayed along the prescribed direction;

wherein the recessed region further has a second vertical face that connects the two regions and that forms a third edge between the second vertical face and a higher one of the regions; and wherein the third edge is inclined with respect to both a tire width direction and a tire circumferential direction.

Thus, at least two regions at base making up recessed region are arrayed so as to have different heights along prescribed direction, and are connected by second vertical face, forming what is referred to as a step. Because third edge is inclined with respect to both the tire width direction and the tire circumferential direction, the edge effect will make it possible to improve performance with respect to traction in snow in what correspond to the front-back and left-right directions of the vehicle.

DETAILED DESCRIPTION OF THE PREFERRED EMBODIMENTS

First Embodiment

Figure 1:
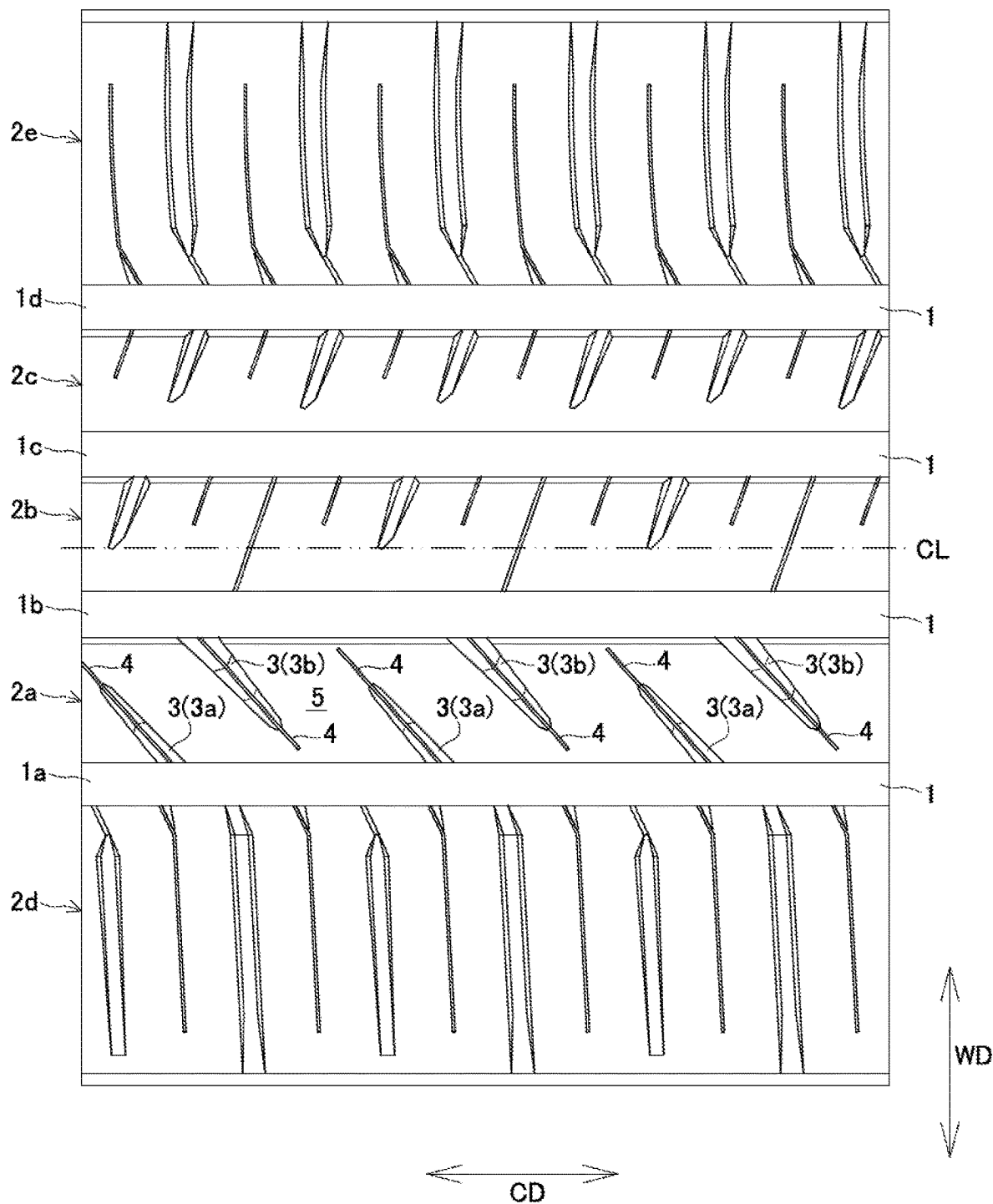
FIG. 1 Plan view showing tread pattern in accordance with a first embodiment

Below, a first embodiment in accordance with the present disclosure is described. In the drawings, "CD" refers to the tire circumferential direction, and "WD" refers to the tire width direction. The respective drawings show shapes as they would exist when the tire is still new.

While not shown in the drawings, a pneumatic tire in accordance with the first embodiment, in similar fashion as with an ordinary pneumatic tire, is provided with a pair of bead cores; a carcass that wraps around the bead cores in toroidal fashion; a belt layer arranged toward the exterior in the tire radial direction from a crown region of the carcass; and a tread region arranged toward the exterior in the tire radial direction from the belt layer.

As shown in FIG. 1, the tread region has a plurality of major grooves 1 (1a, 1b, 1c, 1d) extending in the tire circumferential direction CD, and land portion 2a that is partitioned by two major grooves 1a, 1b and that forms contact patch surface 5. The tread region also has land portion 2b that is partitioned by two major grooves (1b, 1c) and that is arranged at the tire equator CL; land portion 2c that is partitioned by two major grooves (1c, 1d); and land portion 2d [2e] that is partitioned by major groove 1a [1d] which is outwardmost in the tire width direction WD. So long as they extend in the tire circumferential direction, the major grooves may coincide with the tire circumferential direction or may be inclined with respect thereto, and/or may be zigzag-shaped. The number of major grooves that are present may be varied as appropriate. Whereas in the present embodiment there are four major grooves 1 arranged so as to avoid tire equator CL, there is no limitation with respect thereto. For example, the present disclosure may also be understood to apply to the situation in which a land portion is partitioned by a first major groove that is arranged on tire equator CL and a second major groove.

Contact patch surface 5 refers to the surface that contacts the road surface when a tire inflated to normal internal pressure mounted on a normal rim and bearing a normal load is disposed in perpendicular fashion above a flat road surface. A normal rim is that particular rim which is specified for use with a particular tire in the context of the body of standards that contains the standard that applies to the tire in question. This is referred to as a "standard rim" in the case of JATMA, as a "design rim" in the case of TRA, and as a "measuring rim" in the case of ETRTO.

Normal internal pressure is that air pressure which is specified for use with a particular tire in the context of the body of standards that contains the standard that applies to the tire in question. This is referred to as "maximum air pressure" in the case of JATMA, the maximum value listed in the table entitled "Tire Load Limits at Various Cold Inflation Pressures" in the case of TRA, and as "inflation pressure" in the case of ETRTO, which when the tire is to be used on a passenger vehicle is taken to be an internal pressure of 180 KPa.

Normal load is that load which is specified for use with a particular tire in the context of the body of standards that contains the standard that applies to the tire in question. This is referred to as "maximum load capacity" in the case of JATMA, the maximum value listed in the aforementioned table in the case of TRA, and as "load capacity" in the case of ETRTO, which when the tire is to be used on a passenger vehicle is taken to be 85% of the load corresponding to an internal pressure of 180 KPa.

Figure 2A:
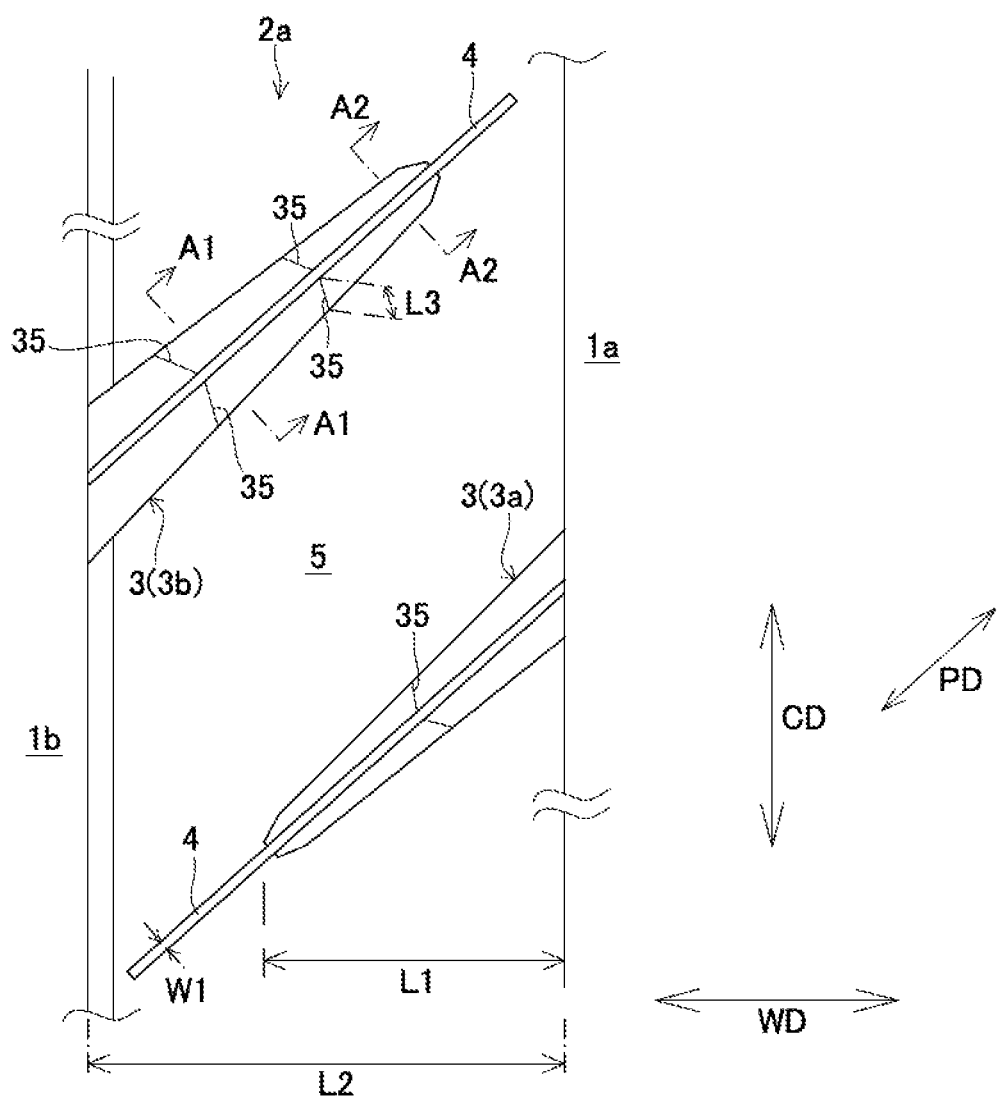
FIG. 2A Plan view showing land portion in which recessed regions and sipes are formed FIG. 2B Drawing showing projection in the tire width direction of the shape of a sipe at a central portion in the width direction of the sipe FIG. 3A Sectional view taken along section A1-A1 in FIG. 2A FIG. 3B Sectional view taken along section A2-A2 in FIG. 2A FIG. 4A Tire meridional section of land portion FIG. 4B Tire meridional section of a land portion in accordance with a variation FIG. 5 Perspective view of recessed region and sipe FIG. 6A Sectional view taken along section A3-A3 in FIG. 5
Figure 2B:
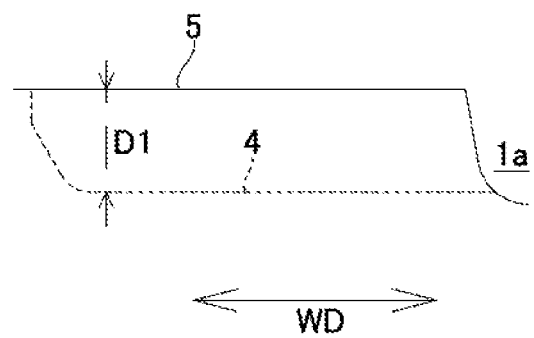

As shown in FIG. 1 and FIG. 2A, formed at land portion 2a are sipes 4 that extend from one of two major grooves 1a, 1b so as to be directed toward the center in the tire width direction of land portion 2a. As shown in FIG. 2A, it is preferred that width W1 of sipe 4 be 0.3 mm to 1.2 mm. FIG. 2B is a drawing showing the projection in the tire width direction WD of the shape of sipe 4 at the center in the width direction of sipe 4. As shown in FIG. 2B, it is preferred that depth D1 of sipe 4 be 2 mm to 7 mm.

Figure 3A:
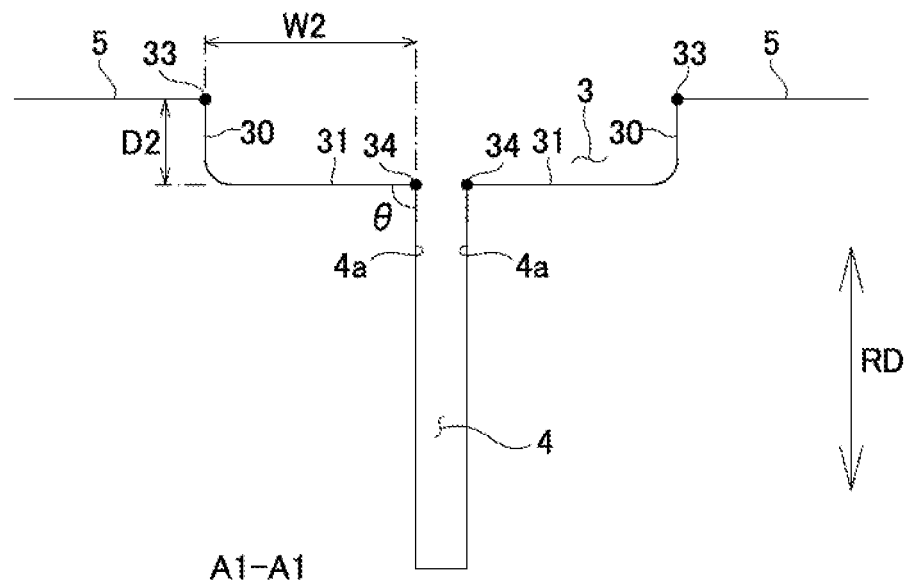
Figure 3B:
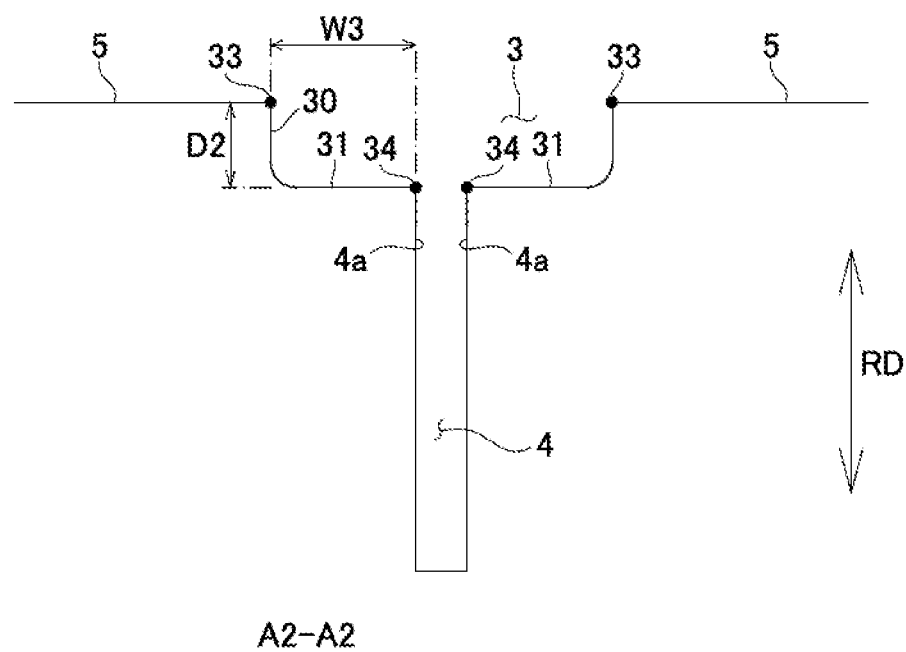

FIG. 3A and FIG. 3B are views taken along sections in the width direction of sipe 4 and recessed region 3. As shown in FIG. 3A and FIG. 3B, opening sidewall 4a which forms the opening of sipe 4 extends in the vertical direction which is parallel to the tire radial direction RD. Note that while not only opening sidewall 4a which forms the opening of sipe 4 but also the entire sidewall extends in the vertical direction in the present embodiment, there is no limitation with respect thereto. So long as opening sidewall 4a which forms the opening of sipe 4 extends in the vertical direction, the shape of the lower portion and/or the central portion of the sipe may be varied as appropriate.

As shown in FIG. 1, FIG. 2A, FIG. 3A, and FIG. 3B, formed at land portion 2a is recessed region 3 which is recessed relative to contact patch surface 5. Recessed region 3 is formed to either side in the width direction of sipe 4. Recessed region 3 extends from one of two major grooves 1a, 1b so as to be directed toward the center in the tire width direction of land portion 2a. While recessed region 3 is inclined with respect to both the tire width direction WD and the tire circumferential direction CD in accordance with the first embodiment, there is no limitation with respect thereto. So long as it extends so as to be inclined with respect to the tire circumferential direction CD, the direction in which recessed region 3 extends may coincide with the tire width direction WD. Recessed region 3 is such that a first end thereof opens into major groove 1, and a second end thereof terminates within the interior of land portion 2a. As shown in FIG. 2A, it is preferred that length L1 in the tire width direction of recessed region 3 be 50% to 90% of length L2 in the tire width direction of land portion 2a. The reason for this is that this will facilitate attainment of traction due to first edge 33 and second edge 34, as is described below.

A plurality of recessed regions 3 are provided at land portion 2a which is partitioned by first major groove 1a and second major groove 1b. The plurality of recessed regions 3 comprise a plurality of first recessed regions 3a extending from first major groove 1a so as to be directed toward the center in the tire width direction of land portion 2a and terminating within the interior of land portion 2a, and a plurality of second recessed regions 3b extending from second major groove 1b so as to be directed toward the center in the tire width direction of land portion 2a and terminating within the interior of land portion 2a. As shown in FIG. 1 and FIG. 2A, the plurality of first recessed regions 3a and the plurality of second recessed regions 3b are arranged in alternating fashion along the tire circumferential direction CD.

As shown in FIG. 3A and FIG. 3B, recessed region 3 has first vertical face 30 which descends in a vertical direction (RD) from contact patch surface 5, and base 31 which intersects opening sidewall 4a of sipe 4. First vertical face 30 forms first edge 33 between it and contact patch surface 5. Base 31 and opening sidewall 4a form second edge 34 at which the angle between base 31 and opening sidewall 4a is not greater than 90°. In the example at FIG. 3A and FIG. 3B, because base 31 extends in the horizontal direction, the angle between base 31 and opening sidewall 4a (angle θ at second edge 34) is 90° As a result of the fact that base 31 extends in the horizontal direction, it is possible to improve contact patch pressure in the vicinity of the edge as compared with the situation that would exist were base 31 to be inclined in such fashion as to descend toward the interior in the tire radial direction as one proceeds toward the center of recessed region 3.

As shown in FIG. 3A and FIG. 3B, standoff distances W2, W3 to first edge 33 and second edge 34 in the width direction of sipe 4 (i.e., widths W2, W3 of base 31 in the width direction of recessed region 3) increase as one proceeds from the center of land portion 2a to the end of land portion 2a. The relationship W2>W3 is satisfied. Width of recessed region 3 (width of base 31) may vary gradually and/or may vary in stepwise fashion.

As shown in FIG. 2A, FIG. 3A, and FIG. 3B, difference D2 in the height in the vertical direction (RD) of first edge 33 and second edge 34 is greater than or equal to 0.5 mm but is less than or equal to 1.5 mm. Furthermore, distances to first edge 33 and second edge 34 in the width direction of sipe 4 are not less than 1.5 mm. That is, W2>1.5 mm, and W3≥1.5 mm.

Thus, because difference D2 in the height in the vertical direction of first edge 33 and second edge 34 is not greater than 1.5 mm, and because distances to first edge 33 and second edge 34 in the width direction of sipe 4 are not less than 1.5 mm, it will be possible to achieve a situation in which deformation by land portion 2a when acted upon by a load is capable of causing second edge 34 to come in contact with the ground, as a result of which it will be possible to obtain a double edge effect due to action by first edge 33 and second edge 34. For example, where D2>1.5 mm, second edge 34 will tend not to make contact with the ground, and it will tend to be impossible to obtain an edge effect due to action by second edge 34. Furthermore, where W2 (W3)<1.5 mm, as second edge 34 will be too close to first vertical face 30, second edge 34 will tend not to make contact with the ground, and it will tend to be impossible to obtain an edge effect due to action by second edge 34. While it will be possible to obtain an edge effect due to action by first edge 33 if D2>0.5 mm, it will tend to be impossible to obtain an edge effect due to action by first edge 33 if D2<0.5 mm.

It is preferred that standoff distances W2, W3 to first edge 33 and second edge 34 in the width direction of sipe 4 are not greater than 3.0 mm. W2≤3.0 mm, and W3≤3.0 mm. For example, where W2 (W3)>3.0 mm, recessed region 3 will be large and rigidity of 2a will be low, which will impair performance with respect to stability in handling. Of course, where deterioration in performance with respect to stability in handling can be tolerated, it is possible to adopt a constitution in which W2 (W3)>3.0 mm.

Figure 5:
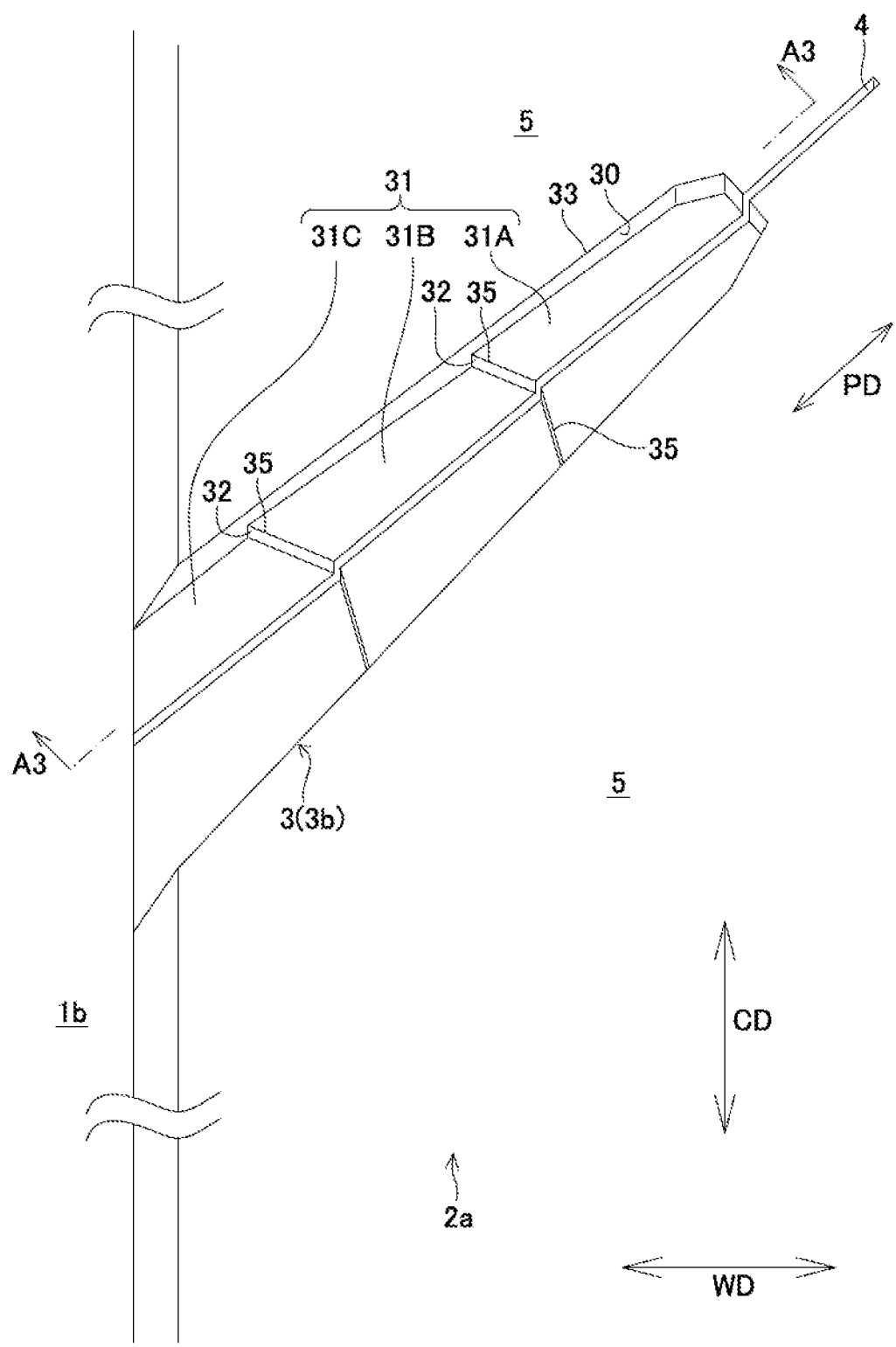
Figure 6A:
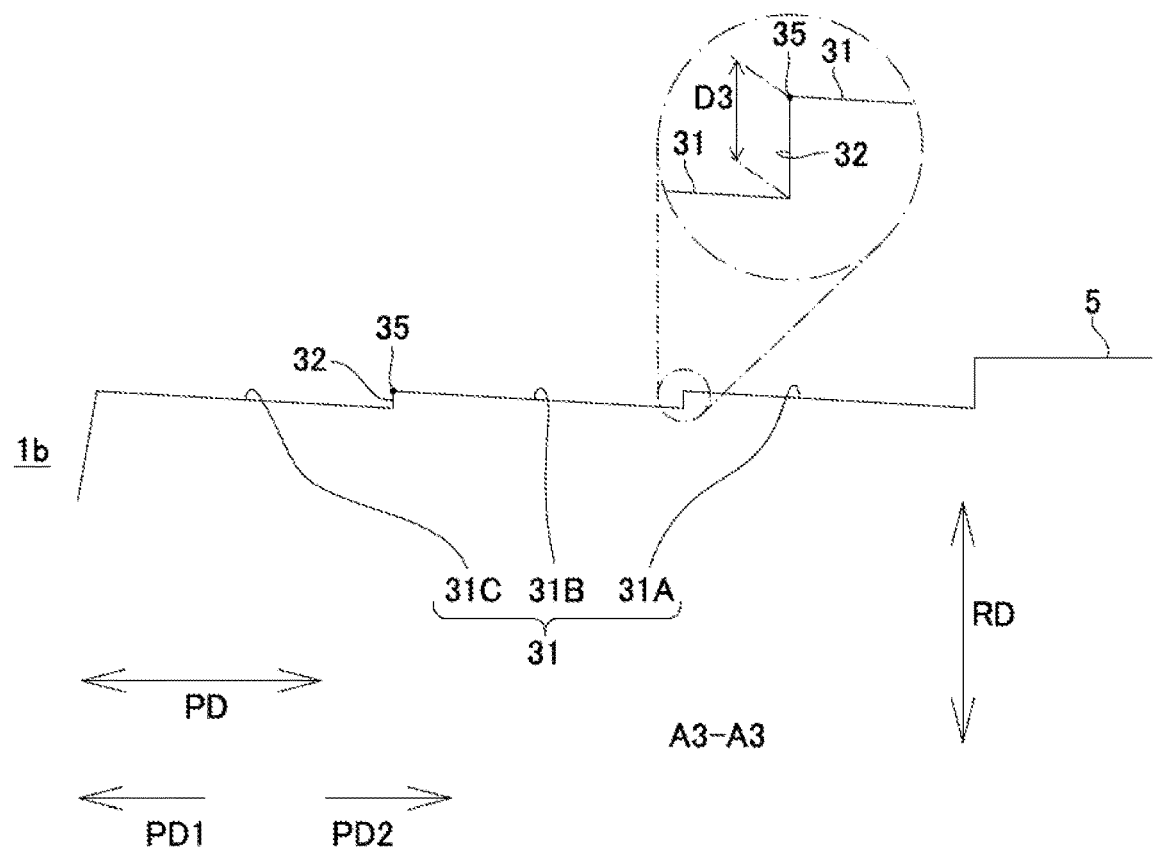
FIG. 6B Sectional view taken along section A3-A3 in accordance with a variation
FIG. 6C Plan view showing land portion in which recessed regions and sipes are formed in accordance with a variation FIG. 7 Sectional view taken along section A1-A1 in accordance with a variation FIG. 8 Plan view showing land portion in which recessed regions and sipes are formed in accordance with a variation FIG. 9A Sectional view taken along section A1-A1 in accordance with a variation FIG. 9B Sectional view taken along section A1-A1 in accordance with a variation FIG. 10 Plan view showing tread pattern in accordance with a second embodiment FIG. 11 Plan view showing land portion in which sipe and recessed region are formed in accordance with the second embodiment FIG. 12A Sectional view taken along section A1-A1 in FIG. 9

FIG. 5 is a perspective showing recessed region 3 and sipe 4. FIG. 6A is a vertical sectional view taken along section A3-A3 in FIG. 5. As shown in FIG. 2A and FIG. 5, recessed region 3 extends in the direction in which the sipe extends (prescribed direction PD). As shown in FIG. 5 and FIG. 6A, recessed region 3 has first vertical face 30 that forms first edge 33 between it and contact patch surface 5, and base 31 that extends in the width direction of recessed region 3 which is perpendicular to prescribed direction PD. Base 31 has at least two regions 31A, 31B, 31C that are arrayed along prescribed direction PD. While second recessed region 3b shown in FIG. 5 has three regions 31A, 31B, 31C, so long as there are not less than two thereof, the number of regions that are present may be varied as appropriate. For example, there are two regions formed at first recessed region 3a shown in FIG. 2A. Heights in the tire radial direction RD of the respective regions 31A, 31B, 31C are mutually different. Recessed region 3 furthermore has second vertical face 32 that connects two regions and that forms third edge 35 between it and the higher of those two regions. Second recessed region 3b has second vertical face 32 that connects two regions 31A, 31B and that forms third edge 35 between it and the higher 31A of those two regions, and second vertical face 32 that connects two regions 31B, 31C and that forms third edge 35 between it and the higher 31B of those two regions. Third edge 35 is inclined with respect to both the tire width direction WD and the tire circumferential direction CD.

Thus, because third edge 35 is inclined with respect to both the tire width direction WD and the tire circumferential direction CD, the edge effect will make it possible to improve performance with respect to traction in snow in what correspond to the front-back and left-right directions of the vehicle.

As has been described above, it is preferred as shown in FIG. 3A and FIG. 3B that maximum depth D2 of recessed region 3 from first edge 33 to base 31 be not greater than 1.5 mm. As shown in FIG. 6A, it is preferred that length D3 in the depth direction of second vertical face 32 be greater than or equal to 0.5 mm but is less than or equal to 1.5 mm. Where D2≤1.5 mm, this will make it possible to suppress decrease in rigidity at land portion 2a as compared with the situation that would exist were depth of recessed region 3 to be made greater than this, as a result of which it will be possible to maintain performance with respect to stability in handling. And yet at the same time, because maximum depth D2 of recessed region 3 is not greater than 1.5 mm, it will be possible for third edge 35 to make contact with the ground when the tire comes in contact with the ground, making it possible for an edge effect due to action by third edge 35 to be exhibited. Moreover, because length D3 in the depth direction of second vertical face 32 is not less than 0.5 mm, it will be possible to ensure attainment of the edge effect.

As shown in FIG. 6A, base 31 has third edge 35 at the end to the first side PD1 in prescribed direction PD, base 31 being inclined in such fashion as to cause height of the third edge to be further toward the exterior RD1 in the tire radial direction than the end to the second side PD2 in prescribed direction PD. Moreover, the locations in the tire radial direction RD of two regions 31A, 31B which are mutually adjacent in prescribed direction PD mutually overlap. This being the case, recessed region 3 formed by regions 31A, 31B will not be too deep, and it will be possible to suppress decrease in rigidity at land portion 2a, and to maintain performance with respect to stability in handling. Moreover, there will be increased tendency for third edge 35 to come in contact with the ground, and it will be possible to improve the edge effect as compared with the situation that exists when base 31 is horizontal. Whereas in the example shown in FIG. 6A the locations of the heights of the ends at the first side PD1 of the respective regions 31A, 31B, 31C are mutually the same, and the locations of the heights of the ends at the second side PD2 are mutually the same, there is no limitation with respect thereto. It is sufficient that the locations in the tire radial direction RD of at least a portion of two adjacent regions be the same.

As shown in FIG. 2A, it is preferred that length L3 of third edge 35 as seen in plan view be not less than 2 mm. That is because this will make it possible to ensure proper attainment of edge effect due to action by third edge 35.

As shown in FIG. 2A and FIG. 5, a direction perpendicular to prescribed direction PD is the width direction of recessed region 3. Recessed region 3 has at least two third edges 35. At least one third edge 35 arranged at a first side in the width direction of recessed region 3, and at least one third edge 35 arranged at a second side in the width direction of recessed region 3, are inclined in different directions with respect to prescribed direction PD as seen in plan view. At same drawings, sipe 4 is formed between third edge(s) 35 arranged at the first side and third edge(s) 35 arranged at the second side.

Thus, because directions in which third edges 35 are inclined are different, it will be the case that a direction that might be poorly dealt with by one third edge 35 will be capable of being handled by another third edge 35, and it will be possible to improve performance with respect to traction in snow in all directions, i.e., the front-back and left-right directions, of the vehicle.

On a snowy road surface, there is ordinarily a tendency for the coefficient of friction μ to be low and for contact patch pressure to be low at end 20 in the tire width direction WD of land portion 2a, and conversely for contact patch pressure to be high at central region 21 in the tire width direction of land portion 2a. In accordance with the present embodiment, because the width of recessed region 3 increases as one proceeds from the center of land portion 2a to the end of land portion 2a, contact patch area at the end portion of land portion 2a will be less than contact patch area toward the center, increasing contact patch pressure per unit area at the end portion of land portion 2a and making it possible to achieve increased uniformity in contact patch pressure.

On the other hand, on a dry road surface, the mechanism being different from that which is responsible for the situation on a snowy road surface, there is ordinarily a tendency for contact patch pressure to be high at end 20 in the tire width direction WD of land portion 2*a* due to the high coefficient of friction μ and the increased tendency to make contact with the ground thereat, and conversely there is a tendency for central region 21 in the tire width direction of land portion 2*a* not to make contact with the ground and for contact patch pressure to be low thereat, which produces nonuniformity in contact patch pressure.

Figure 4A:
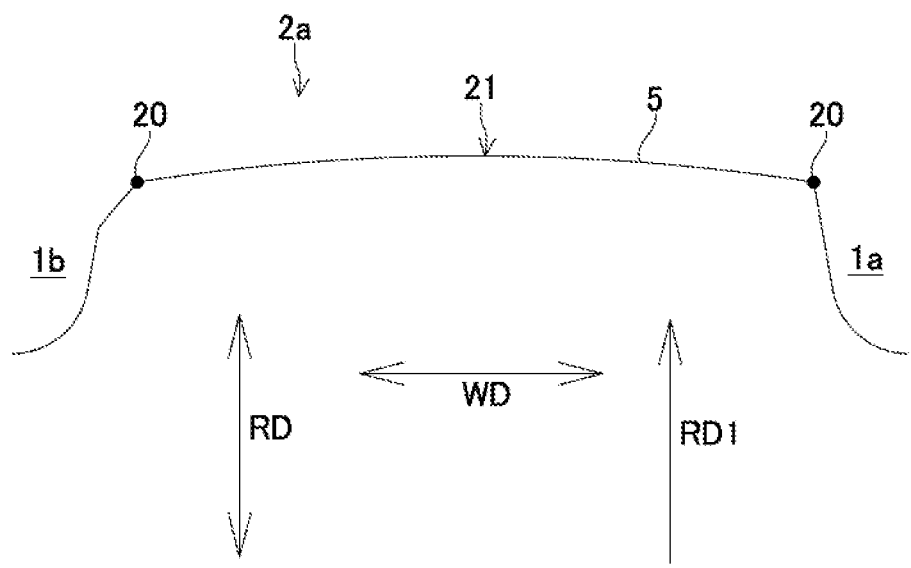

In accordance with the first embodiment, as shown in FIG. 4A, to reduce nonuniformity in contact patch pressure when on a dry road surface and to improve contact patch characteristics when on a dry road surface, land portion 2*a* as viewed in a tire meridional section is such that central region 21 in the tire width direction protrudes toward the exterior RD1 in the tire radial direction relative to either end 20 in the tire width direction WD. The protruding shape thereof is formed from at least one curve having at least one radius of curvature. As used herein, central region 21 in the tire width direction of land portion 2*a* refers to that region which is disposed toward the interior in the tire width direction WD from the two ends 20 in the tire width direction WD of land portion 2*a*. The two ends 20 in the tire width direction WD of land portion 2*a* refer to the ends thereof at contact patch surface 5. By thus causing central region 21 in the tire width direction of land portion 2*a* to protrude beyond end(s) 20, it is possible to increase the tendency for central region 21 in the tire width direction to make contact with the ground as compared with end(s) 20 and increase contact patch pressure at central region 21 in the tire width direction when on a dry road surface, making it possible to achieve increased uniformity in contact patch pressure and improve performance with respect to stability in handling.

On the other hand, causing central region 21 in the tire width direction of land portion 2*a* to protrude toward the exterior RD1 in the tire radial direction relative to end(s) 20 will decrease the tendency for end(s) 20 of land portion 2*a* to make contact with the ground as compared with central region 21 in the tire width direction, which will disadvantage edge components at end(s) 20 as compared with central region 21 in the tire width direction. However, because the width of recessed region 3 is made to increase as one proceeds from the center of land portion 2*a* to the end of land portion 2*a*, this increases the effect of second edge 34 at end 20 of land portion 2*a*, making it possible to ensure that there will be edge components thereat.

Figure 4B:
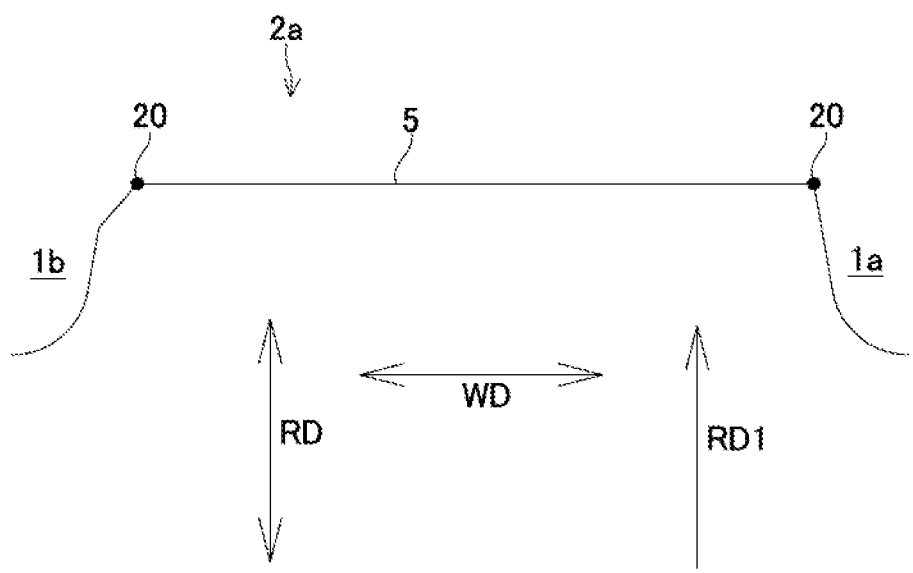

Of course, as shown in FIG. 4B, where there is no intention to improve contact patch characteristics when on a dry road surface such as might be the case not with an all-season tire but with a studless tire, land portion 2*a* as viewed in a tire meridional section need not be such that central region 21 in the tire width direction protrudes toward the exterior RD1 in the tire radial direction relative to either end 20 in the tire width direction WD, it being possible for the region between ends 20 in the tire width direction of land portion 2*a* to be flat.

Variations Whereas in the example shown in FIG. 1 and FIG. 2A the first end of sipe 4 *a* opens into major groove 1 and the second end thereof terminates within the interior of land portion 2*a*, there is no limitation with respect thereto. For example, both the first end and the second end of sipe 4 *a* may open into major groove 1. Furthermore, whereas in accordance with the first embodiment the direction in which sipe 4 extends is such that it is inclined with respect to both the tire width direction WD and the tire circumferential direction CD, there is no limitation with respect thereto. So long as it extends so as to be inclined with respect to the tire circumferential direction CD, the direction in which sipe 4 extends may coincide with the tire width direction WD.

Whereas in accordance with the first embodiment the first recessed regions 3*a* and the second recessed regions 3*b* are arranged in alternating fashion along the tire circumferential direction CD, there is no limitation with respect thereto. The first recessed regions 3*a* and the second recessed regions 3*b* need not be arranged in alternating fashion along the tire circumferential direction CD. Furthermore, whereas both first recessed regions 3*a* and second recessed regions 3*b* are arranged at land portion 2*a*, there is no limitation with respect thereto. An example in which first recessed regions 3*a* are formed at the land portion but second recessed regions 3*b* are not formed thereat may be cited as example. Similarly, an example in which second recessed regions 3*b* are formed at the land portion but first recessed regions 3*a* are not formed thereat may be cited.

Moreover, whereas first recessed regions 3*a* and second recessed regions 3*b* are inclined in the same direction with respect to the tire width direction, there is no limitation with respect thereto. First recessed regions 3*a* and second recessed regions 3*b* may be inclined in mutually opposite directions.

Figure 7:
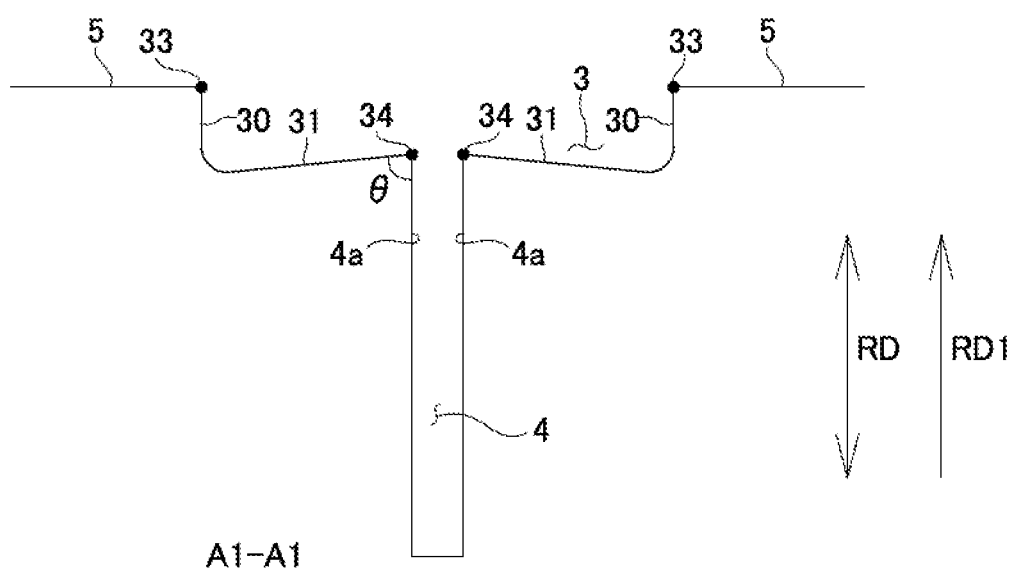

Furthermore, whereas, in accordance with the first embodiment, base 31 extends in the horizontal direction, there is no limitation with respect thereto. For example as shown in FIG. 7, base 31 may be inclined in such fashion that the height thereof increases so as to be increasingly directed toward the exterior RD1 in the tire radial direction as one proceeds toward the center in the width direction of recessed region 3 as viewed in a section taken along the width direction of recessed region 3. Where this is the case, the angle between base 31 and opening sidewall 4*a* (the angle at second edge 34) will be less than 90°. By thus causing the angle at second edge 34 to be less than 90°, because this will increase the surface area of recessed region 3 (base 31), it will be possible to improve performance with respect to dissipation of heat.

Figure 8:
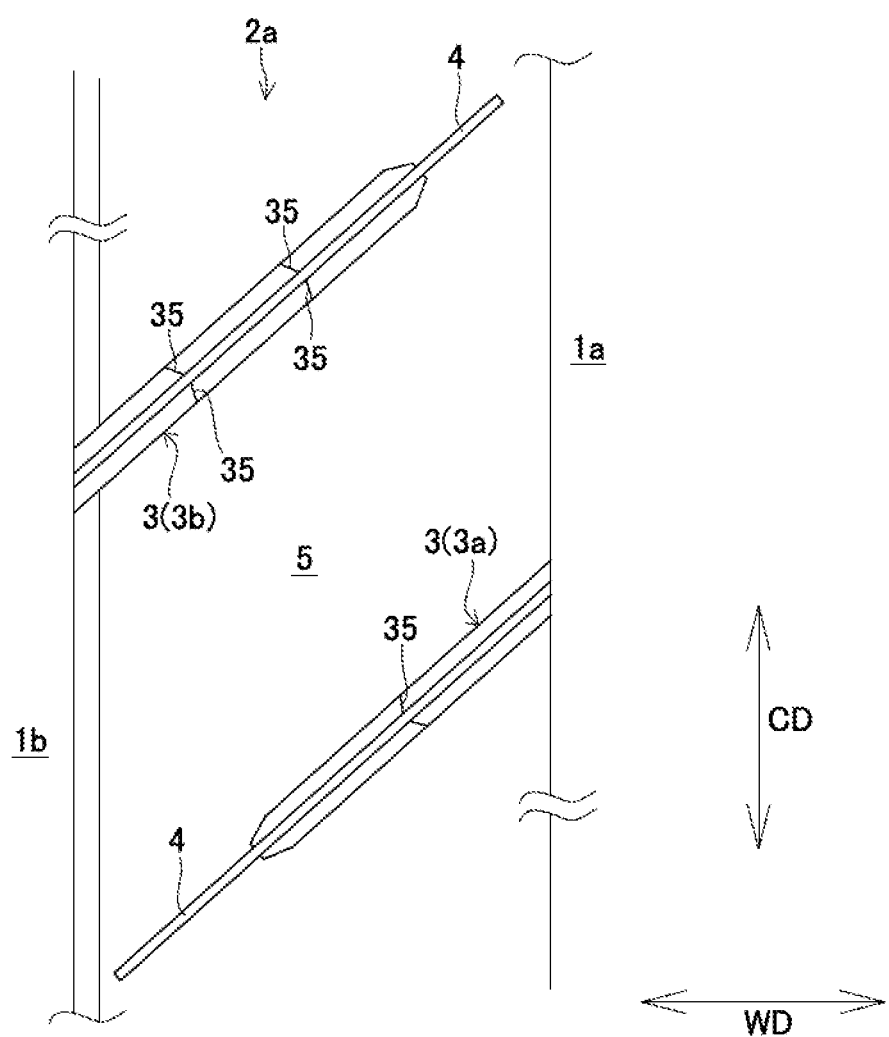

Whereas in accordance with the first embodiment the width of recessed region 3 (the width of base 31) increases as one proceeds from the center of land portion 2*a* to the end of land portion 2*a*, there is no limitation with respect thereto. For example as shown in FIG. 8, width of recessed region 3 (width of base 31) may be constant.

Figure 9A:
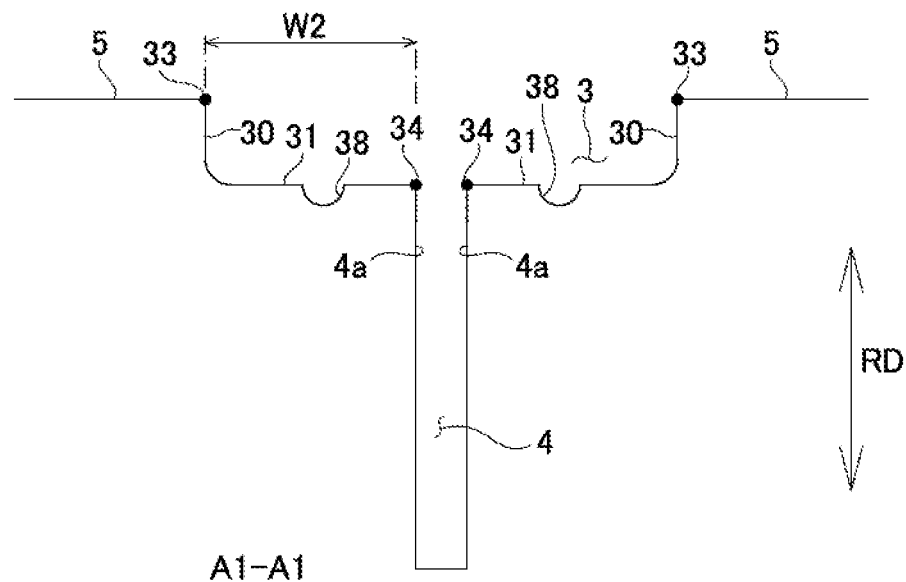
Figure 9B:
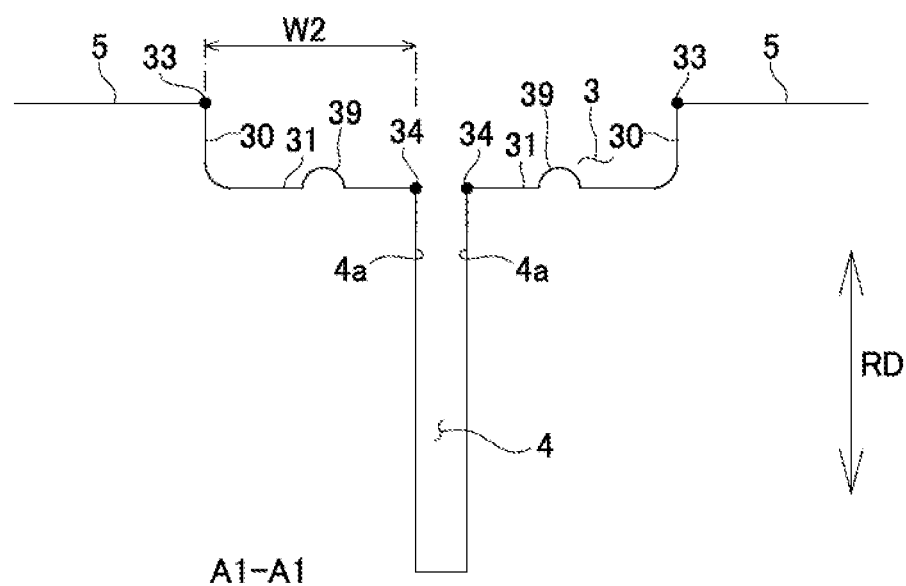

Furthermore, whereas, in accordance with the first embodiment, base 31 is a flat surface, there is no limitation with respect thereto. For example as shown in FIG. 9A, one or more dimples 38 of width less than width W2 of base 31 may be formed at base 31. Or in another example as shown in FIG. 9B, one or more protrusions 39 of width less than width W2 of base 31 may be formed at base 31.

At the embodiment shown in FIG. 1, the land portion (s) 2*a* to which the present disclosure may be applied are not limited to mediate land portion (s) 2*a*. For example, the present disclosure may be applied to center land portion(s) 2*b*, to other mediate land portion(s) 2*c*, and/or to shoulder land portion(s) 2*d*.

Figure 6B:
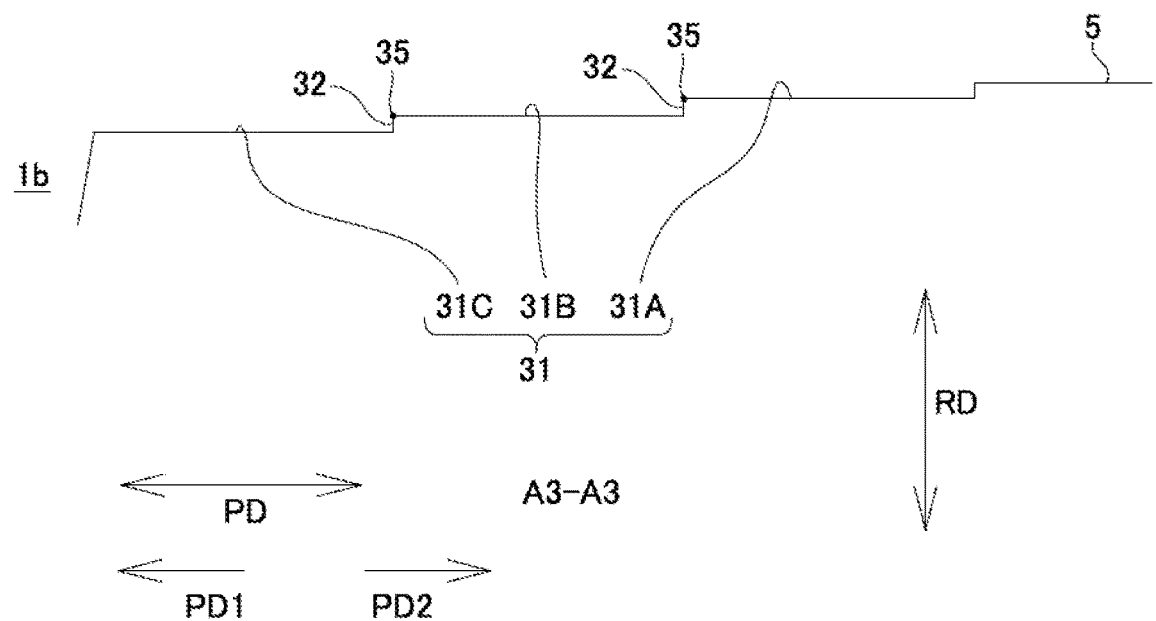

Whereas base 31 shown in FIG. 6A is inclined with respect to the horizontal direction, there is no limitation with respect thereto. As shown in FIG. 6B, base 31 may extend in the horizontal direction.

Figure 6C:
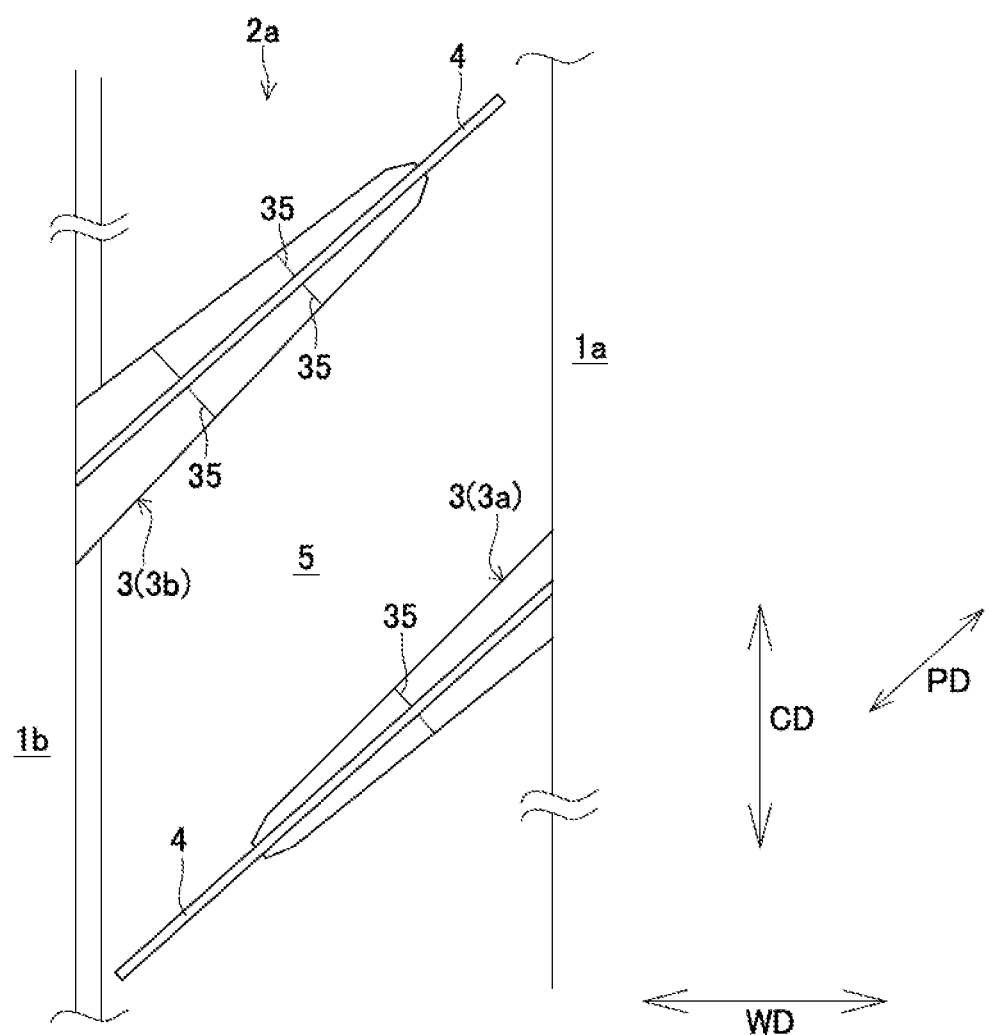

Whereas, as shown in FIG. 2A and FIG. 5, third edge 35 at the first side in the width direction of sipe 4 and third edge 35 at the second side in the width direction of sipe 4 are inclined in different directions with respect to prescribed direction PD as seen in plan view, there is no limitation with respect thereto. For example, as shown in FIG. 6C, the directions in which these are inclined may be the same, and the two varieties of third edges 35 may moreover be mutually parallel as seen in plan view.

As described above, a pneumatic tire in accordance with the first embodiment comprises a land portion 2a that is partitioned by at least one major groove (1a, 1b) and that forms a contact patch surface 5; a sipe 4 that extends from the at least one major groove 1a [1b] so as to be directed toward a center in a tire width direction of the land portion 2a, the sipe 4 having an opening sidewall 4a extending in a vertical direction (RD); and a recessed region 3 that is formed to either side in a width direction of the sipe 4 and that is recessed relative to the contact patch surface 5. The recessed region 3 has a vertical face 30 that forms a first edge 33 between the vertical face 30 and the contact patch surface 5, and has a base 31 that intersects the opening sidewall 4a of the sipe 4. The base 31 and the opening sidewall 4a of the sipe 4 forming a second edge 34 at which the angle θ between the base 31 and the opening sidewall 4a is not greater than 90°. Difference in height in the vertical direction of the first edge and the second edge is greater than or equal to 0.5 mm but is less than or equal to 1.5 mm. Distances to the first edge and the second edge in the width direction of the sipe are not less than 1.5 mm.

Thus, recessed region 3 is formed to either side in the width direction of sipe 4 formed at land portion 2a, recessed region 3 being formed from vertical face 30 and base 31. Because first edge 33 is formed between contact patch surface 5 and vertical face 30 that extends in parallel fashion with respect to the vertical direction which is parallel to the tire radial direction RD, an edge effect due to action by first edge 33 is exhibited. Furthermore, because second edge 34 is formed between base 31 and opening sidewall 4a of sipe 4, and because angle θ of second edge 34 is not greater than 90°, an edge effect due to action by second edge 34 is exhibited. Moreover, because difference D2 in the height in vertical direction RD of first edge 33 and second edge 34 is not greater than 1.5 mm, and because distances to first edge 33 and second edge 34 in the width direction of sipe 4 are not less than 1.5 mm, it will be the case that deformation by land portion 2a when acted upon by a load will cause second edge 34 to be made capable of coming in contact with the ground, as a result of which it will be possible to obtain a doubling of edge effect due to action by first edge 33 and second edge 34, and it will be possible to improve performance with respect to traction in snow. Because difference D2 in the height in the vertical direction (RD) of first edge 33 and second edge 34 is not less than 0.5 mm, it will be possible to obtain an edge effect due to action by first edge 33.

Accordingly, because two edge effects will be exhibited per side in the width direction of sipe 4, and four edge effects will be exhibited at both sides in the width direction of sipe 4, it will be possible to improve performance with respect to traction in snow.

As is the case in the embodiment shown in FIG. 3A and FIG. 3B, it is preferred that standoff distance(s) W2 (W3) to first edge 33 and to second edge 34 in the width direction of sipe 4 be not greater than 3.0 mm.

If the foregoing standoff distance(s) W2 (W3) exceed 3.0 mm, the increased size of recessed region 3 will result in reduced rigidity at land portion 2a, which will impair performance with respect to stability in handling when on a dry road surface. Accordingly, adoption of the foregoing constitution will make it possible to suppress and/or prevent impairment of performance with respect to stability in handling.

As is the case in the embodiment shown in FIG. 2A, FIG. 3A and FIG. 3B, it is preferred that standoff distances W2 (W3) to the first edge 33 and the second edge 34 in the width direction of the sipe 4 increase as one proceeds from a center of the land portion 2a to an end of the land portion 2a.

On a snowy road surface, there is ordinarily a tendency for the coefficient of friction μ to be low and for contact patch pressure to be low at end 20 in the tire width direction WD of land portion 2a, and conversely for contact patch pressure to be high at central region 21 in the tire width direction of land portion 2a. In accordance with the embodiment shown in FIG. 2A, FIG. 3A, and FIG. 3B, because the foregoing standoff distance(s) (width(s) of recessed region 3) increase as one proceeds from the center of land portion 2a to the end of land portion 2a, contact patch area at the end portion of land portion 2a will be less than contact patch area toward the center, increasing contact patch pressure per unit area at the end portion of land portion 2a and making it possible to achieve increased uniformity in contact patch pressure.

As is the case in the embodiment shown in FIG. 4A, it is preferred that the land portion 2a as viewed in a tire meridional section is such that a central region 21 in the tire width direction protrudes toward an exterior in a tire radial direction (RD) relative to either end 20 in the tire width direction (WD). Furthermore, as is the case in FIG. 2A, it is preferred that standoff distances W2 (W3) to the first edge 33 and the second edge 34 in the width direction of the sipe 4 increase as one proceeds from a center of the land portion 2a to an end of the land portion 2a.

Thus, causing central region 21 in the tire width direction of land portion 2a to protrude toward the exterior RD1 in the tire radial direction relative to end(s) 20 will decrease the tendency for end(s) 20 of land portion 2a to make contact with the ground as compared with central region 21 in the tire width direction, which will disadvantage edge components at end(s) 20 as compared with central region 21 in the tire width direction. However, because the width of recessed region 3 is made to increase as one proceeds from the center of land portion 2a to the end of land portion 2a, this increases the effect of second edge 34 at end 20 of land portion 2a, making it possible to ensure that there will be edge components thereat. Accordingly, it will be possible to simultaneously achieve improvement in both traction in snow as well as in performance with respect to stability in handling when on a dry road surface.

As is the case in the embodiment shown in FIG. 9A and FIG. 9B, it is preferred that one or more dimples 38 and/or protrusions 39 of width less than width W2 of the base 31 are formed at the base 31.

As a result of adoption of this constitution, because edge effects will be exhibited not only due to action by first edge 33 and second edge 34 but also due to action by dimples 38 and/or protrusions 39, it will be possible to further improve performance with respect to traction in snow.

Second Embodiment

Figure 10:
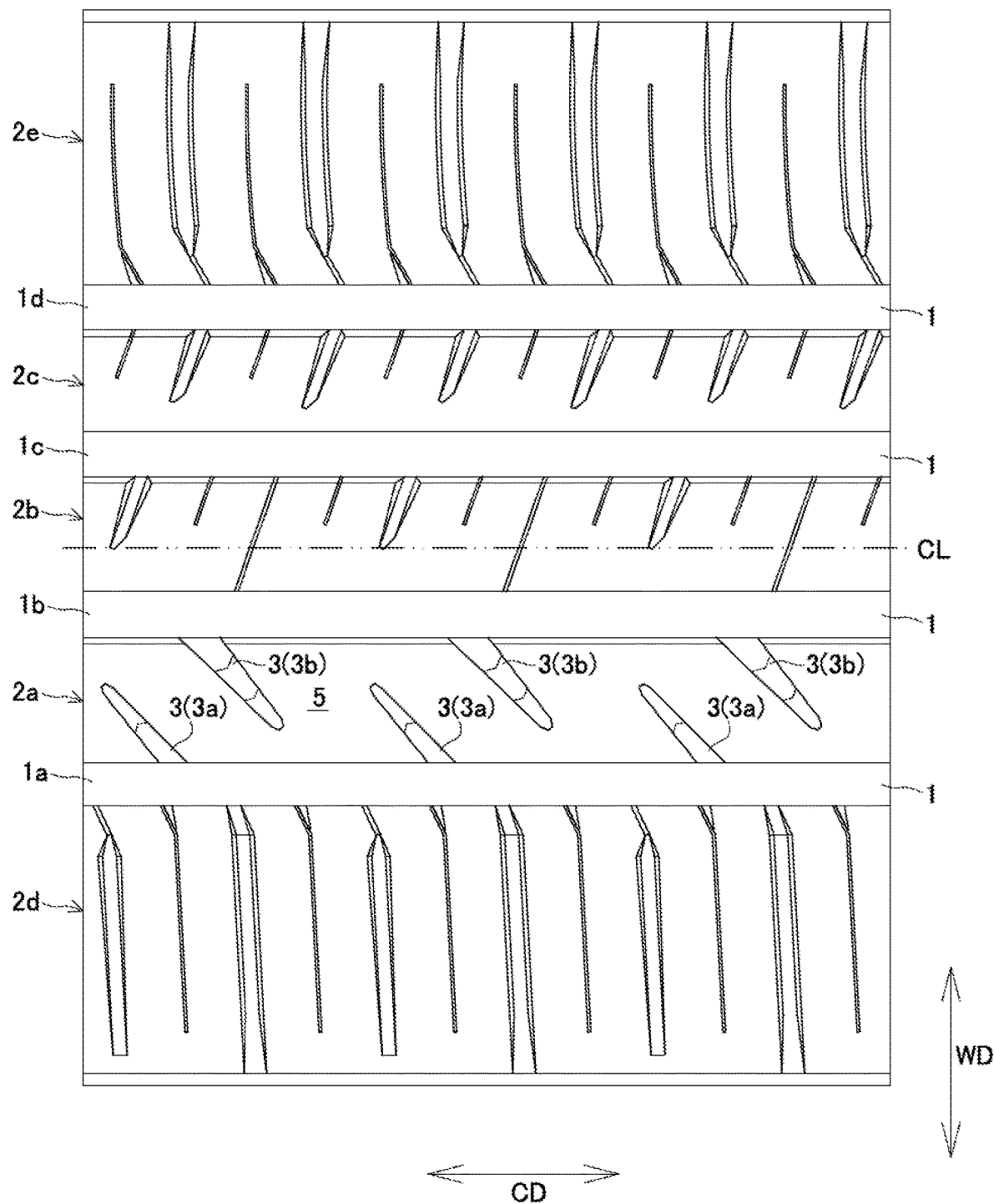
Figure 11:
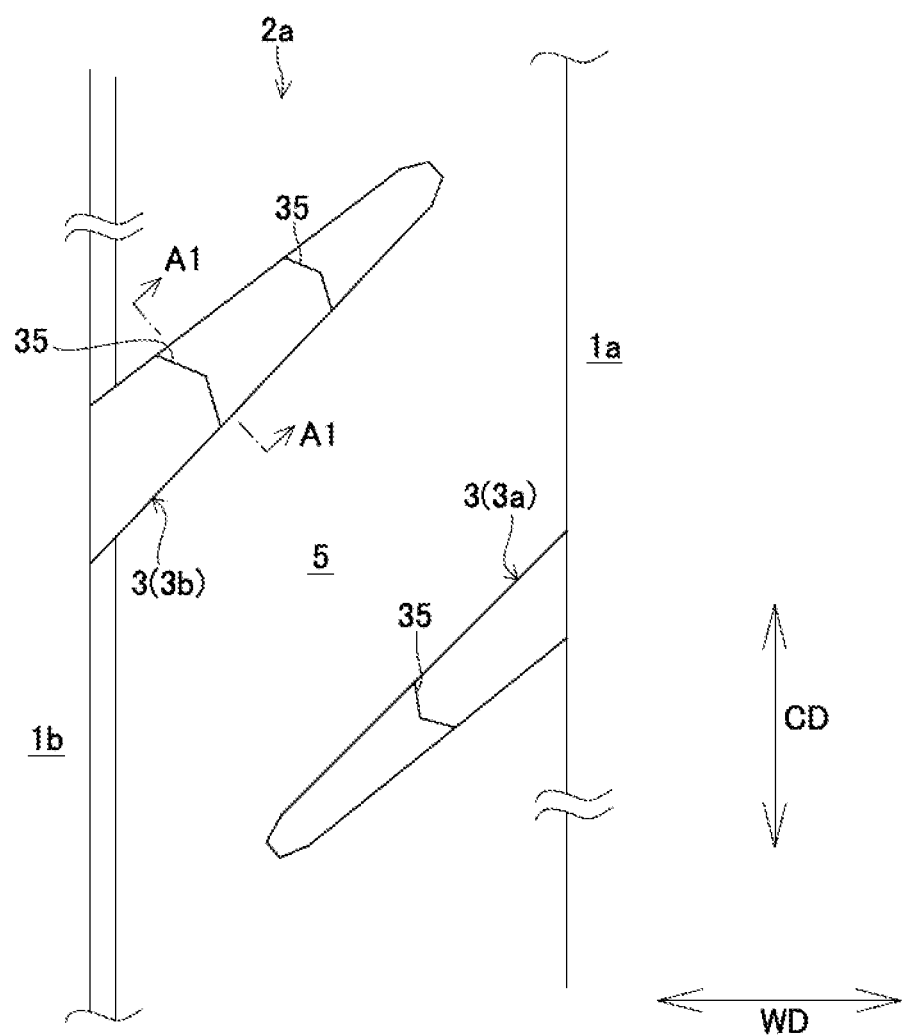
Figure 12A:
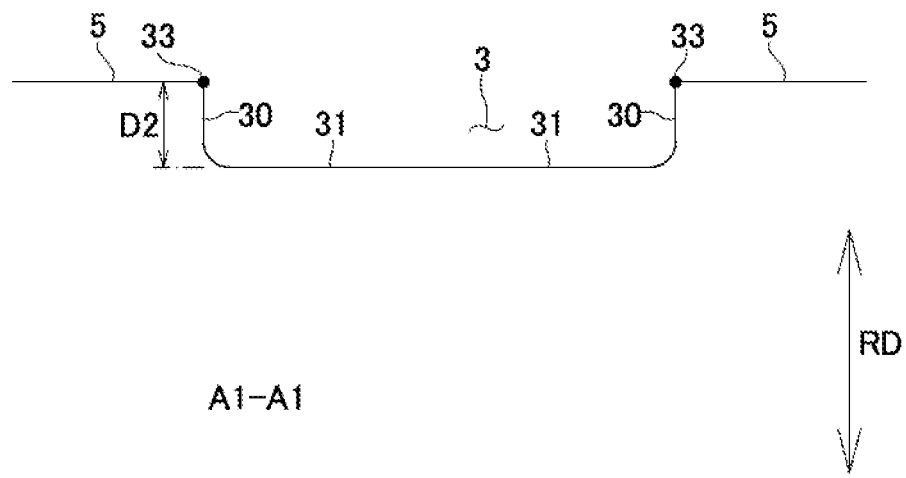
FIG. 12B Sectional view taken along section A1-A1 in accordance with a variation FIG. 13 Perspective view of recessed region and sipe in accordance with the second embodiment
Figure 12B:
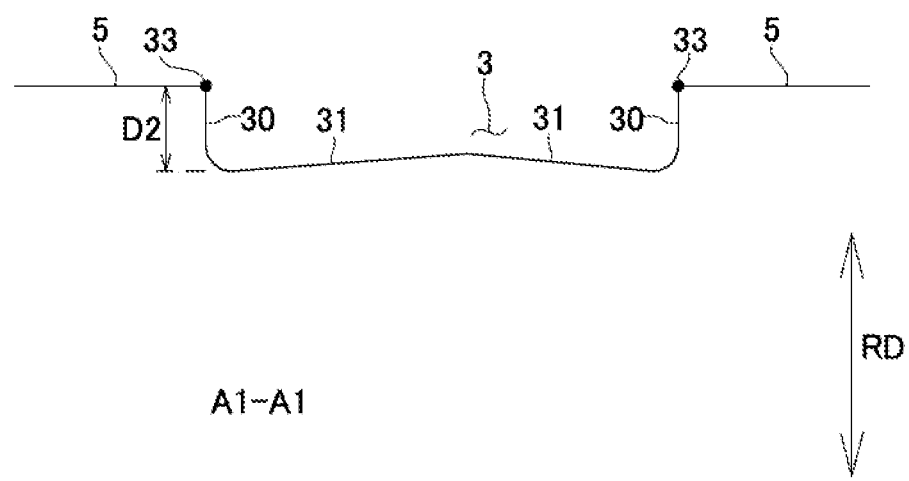
Figure 13:
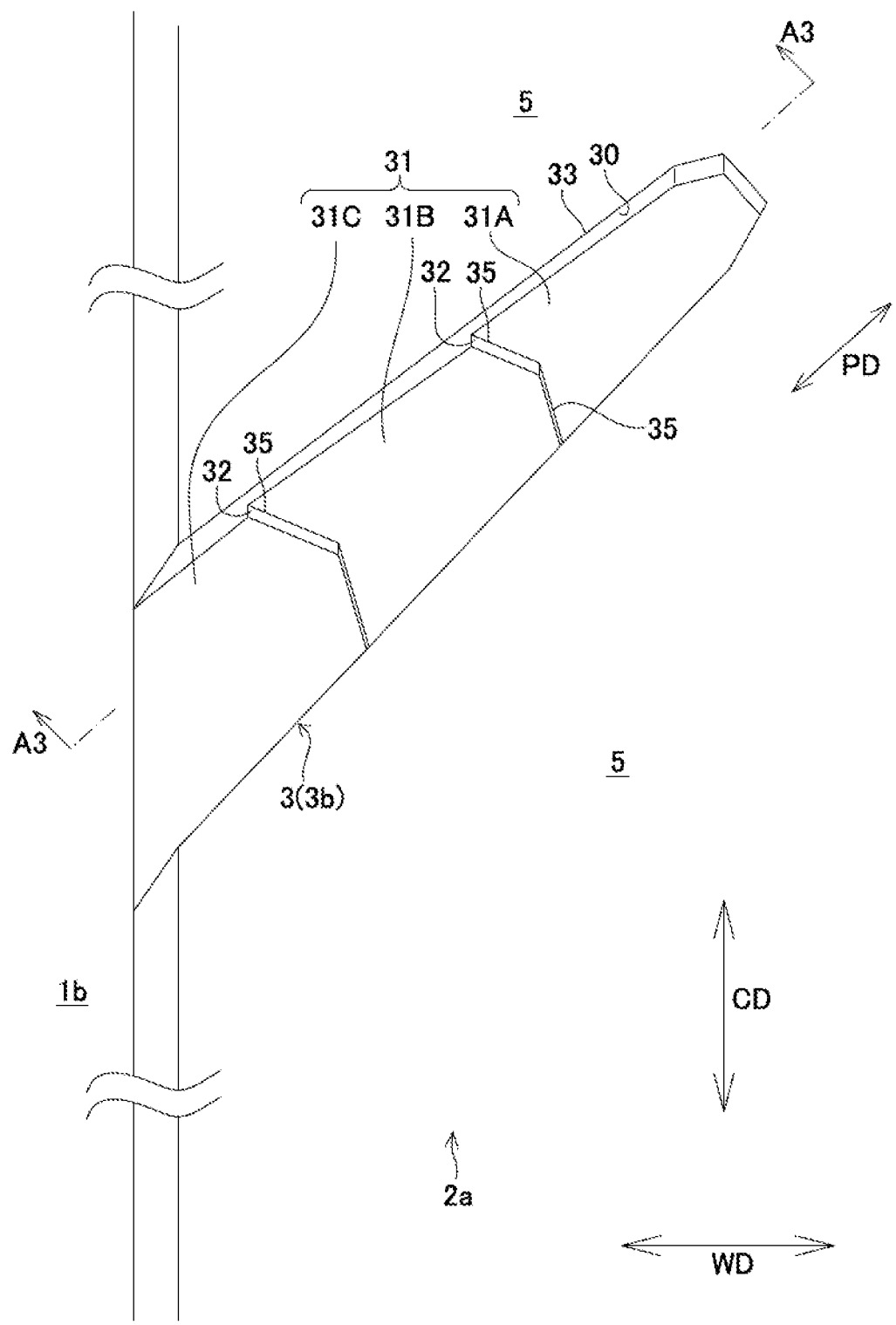

As shown in FIG. 10, FIG. 11, FIG. 12A and FIG. 13, the second embodiment is an embodiment in which sipe 4 of the first embodiment is not provided. FIG. 10 shows the situation that exists when first recessed regions 3a and second recessed regions 3b are arranged in alternating fashion in the tire circumferential direction CD at land portion 2a. FIG. 11 is an enlarged view showing a first recessed region 3a and a second recessed region 3b. FIG. 12A is a sectional view taken along section A1-A1 in FIG. 11. As shown in FIG. 12A, base 31 extends in the horizontal direction. In accordance with a variation as shown in FIG. 12B, base 31 may be inclined in such fashion that the height thereof increases so as to be increasingly directed toward the exterior RD1 in the tire radial direction as one proceeds toward the center in the width direction of recessed region 3 as viewed in a section taken along the width direction of recessed region 3. FIG. 13 is a perspective view of recessed region and sipe in accordance with the second embodiment.

As described above, a pneumatic tire in accordance with the first or second embodiment comprises a land portion 2a that is partitioned by a first major groove 1a and a second major groove 1b, and that forms a contact patch surface 5; a plurality of first recessed regions 3a that extend from the first major groove 1a so as to be directed toward a center in a tire width direction of the land portion 2a, that terminate within an interior of the land portion 2a, and that are recessed relative to the contact patch surface 5; and a plurality of second recessed regions 3b that extend from the second major groove 1b so as to be directed toward the center in the tire width direction of the land portion 2a, that terminate within the interior of the land portion 2a, and that are recessed relative to the contact patch surface 5. The land portion 2a is such that a central region thereof in the tire width direction protrudes relative to either end 20 thereof in the tire width direction WD. The plurality of first recessed regions 3a and the plurality of second recessed regions 3b are arranged in alternating fashion along a tire circumferential direction CD. The respective recessed regions 3 each has a vertical face 30 that descends in a vertical direction (RD) from the contact patch surface 5, and a base 31 that extends in a width direction of the each recessed region 3. The base 31 is horizontal, or is inclined in such fashion that a height thereof increases so as to extend further toward an exterior RD1 in a tire radial direction as one proceeds toward a center of the each recessed region 3 as viewed in a section taken along the width direction of the each recessed region 3. Width W2 (W3) of the base 31 increases as one proceeds from the center in the width direction of the land portion 2a to an end of the land portion 2a.

In accordance with this constitution, because land portion 2a is such that central region 21 in the tire width direction protrudes toward the exterior RD1 in the tire radial direction relative to end(s) 20 in the tire width direction, there will be increased tendency for central region 21 in the tire width direction to make contact with the ground as compared with end(s) 20, increasing contact patch pressure at central region 21 in the tire width direction when on a dry road surface, this being in a direction such as will permit increase in uniformity in contact patch pressure, which will make it possible to improve performance with respect to stability in handling. And yet, if the amount by which this protrudes relative thereto is excessive, this will disturb the balance in contact patch pressure. In this regard, because the width of base 31 (recessed region 3) at the end of land portion 2a is formed so as to be greater than the width of base 31 (recessed region 3) at a location toward the center of the land portion, this will increase contact patch pressure at end(s) 20 in the tire width direction of land portion 2a as compared with central region 21 in the tire width direction of land portion 2a, making it possible to achieve balance in contact patch pressure between the central portion and the end(s), as a result of which performance with respect to stability in handling when on a dry road surface will be improved.

Furthermore, because base 31 is horizontal, or is inclined in such fashion that the height thereof increases so as to extend further toward the exterior RD1 in the tire radial direction as one proceeds toward the center of recessed region 3 as viewed in a section taken along the width direction of recessed region 3, it will be possible to suppress occurrence of a situation in which excessive size of recessed region 3 causes reduced rigidity at land portion 2a and impairment of performance with respect to stability in handling when on a dry road surface.

At the same time, because land portion 2a is such that central region 21 in the tire width direction protrudes beyond the two ends 20 in the tire width direction, it will be possible improve performance with respect to water shedding.

As is the case in the embodiment shown in FIG. 3A and FIG. 3B, it is preferred that the tire further comprising a first edge 33 formed by the contact patch surface 5 and the vertical face 30, difference D2 in height in the vertical direction (RD) of the base 31 and the first edge 33 is greater than or equal to 0.5 mm but is less than or equal to 1.5 mm.

Within this numerical range, it will be possible to properly suppress occurrence of a situation in which excessive size of recessed region 3 causes reduced rigidity at 2a and impairment of performance with respect to stability in handling when on a dry road surface.

As is the case in the first embodiment, a sipe 4 is formed at the central region of the each recessed region 3.

In accordance with this constitution, edge effects are exhibited due to action by sipes 4, making it possible to improve performance with respect to traction. Moreover, sipes 4 facilitate conformability of land portion 2a and the tendency for contact with the ground to occur, making it possible to improve performance with respect to traction and performance with respect to braking.

As described above, a pneumatic tire in accordance with the first or second embodiment comprises a land portion 2a that is partitioned by at least one major groove (1a, 1b) and that forms a contact patch surface 5; and a recessed region 3 that extends along a prescribed direction PD and that is recessed relative to the contact patch surface 5. The recessed region 3 has a first vertical face 30 that that forms a first edge 33 between the first vertical face 30 and the contact patch surface 5, and a base 31 that extends in a width direction of the recessed region 3 which is perpendicular to the prescribed direction PD. The base 31 has at least two regions 31A, 31B, 31C having mutually different heights and arrayed along the prescribed direction PD. The recessed region 3 further has a second vertical face 32 that connects the two regions (31A, 31B, [31B, 31C]) and that forms a third edge 35 between the second vertical face 32 and a higher one (31A, [31B]) of the regions 31A, 31B, 31C. The third edge 35 is inclined with respect to both a tire width direction WD and a tire circumferential direction CD.

Thus, at least two regions 31A, 31B, 31C at base 31 making up recessed region 3 are arrayed so as to have different heights along prescribed direction PD, and are connected by second vertical face 32, forming what is referred to as a step. Because third edge 35 is inclined with respect to both the tire width direction WD and the tire circumferential direction CD, the edge effect will make it possible to improve performance with respect to traction in snow in what correspond to the front-back and left-right directions of the vehicle.

As is the case in the first or second embodiment, it is preferred that maximum depth D2 of the recessed region 3 from the first edge 33 to the base 31 is not greater than 1.5 mm; and length D3 in a depth direction of the second vertical face 32 is greater than or equal to 0.5 mm but is less than or equal to 1.5 mm.

Thus, where maximum depth D2 of recessed region 3 is not greater than 1.5 mm, this will make it possible to suppress decrease in rigidity at land portion 2a as compared with the situation that would exist were depth of recessed region 3 to be made greater than this, as a result of which it will be possible to maintain performance with respect to stability in handling. And yet at the same time, because maximum depth D2 of recessed region 3 is not greater than 1.5 mm, it will be possible for third edge 35 to make contact with the ground when the tire comes in contact with the ground, making it possible for an edge effect due to action by third edge 35 to be exhibited. Moreover, because length D3 in the depth direction of second vertical face 32 is not less than 0.5 mm, it will be possible to ensure proper attainment of the edge effect.

As is the case in the first or second embodiment, it is preferred that length L3 of the third edge 35 as seen in plan view is not less than 2 mm. That is because this constitution will make it possible to ensure proper attainment of edge effect due to action by third edge 35.

As is the case in the first or second embodiment, it is preferred that the base 31 has the third edge 35 at an end to a first side PD1 in the prescribed direction PD, the base 31 being inclined in such fashion as to cause height of the third edge 35 to be further toward an exterior RD1 in a tire radial direction than an end to a second side PD2 in the prescribed direction PD; and locations in the tire radial direction RD of the at least two regions 31A, 31B, 31C which are mutually adjacent in the prescribed direction PD mutually overlap.

In accordance with this constitution, recessed region 3 formed by regions 31A, 31B will not be too deep, and it will be possible to suppress decrease in rigidity at land portion 2a, and to maintain performance with respect to stability in handling. Moreover, there will be increased tendency for third edge 35 to come in contact with the ground, and it will be possible to improve the edge effect as compared with the situation that exists when base 31 is horizontal.

As is the case in the first or second embodiment, it is preferred that the third edge 35 is one of at least two third edges 35 present at the recessed region 3; and at least one third edge 35 which is arranged at a first side in the width direction of the recessed region 3 and at least one third edge 35 which is arranged at a second side in the width direction of the recessed region 3 are inclined in different directions with respect to the prescribed direction PD as seen in plan view.

In addition this constitution, because directions in which third edges 35 are inclined are different, it will be the case that a direction that might be poorly dealt with by one third edge 35 will be capable of being handled by another third edge 35, and it will be possible to improve performance with respect to traction in snow in all directions, i.e., the front-back and left-right directions, of the vehicle.

As is the case in the first embodiment, it is preferred that a sipe 4 is formed at a central region in the width direction of the recessed region 3.

In accordance with this constitution, because sipe 4 will increase the tendency for land portion 2a to make contact with the ground, it will be possible to improve performance with respect to traction and performance with respect to braking.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

The invention claimed is:

1. A pneumatic tire comprising:
a land portion that is partitioned by at least one major groove and that forms a contact patch surface; and
a recessed region that is provided in the land portion, that extends between a first end and a second end along a prescribed direction where the first end contacts one of the at least one major groove and the second end contacts an inside of the land portion, and that is recessed relative to the contact patch surface;
wherein the recessed region has at least one first vertical face that each forms a first edge between the first vertical face and the contact patch surface, and a base that extends in a width direction of the recessed region which is perpendicular to the prescribed direction;
wherein the base comprises at least two planar regions arrayed along the prescribed direction and having discrete stepwise heights configured in such a manner that a depth in a tire radial direction of the recessed region from the first edge to one of the at least two planar regions contacting the first end is greater than a depth in the tire radial direction of the recessed region from the first edge to another one of the at least two planar regions contacting the second end:
wherein the recessed region further has a second vertical face that connects the at least two planar regions and that forms a third edge between the second vertical face and a higher one of the at least two planar regions;
wherein the third edge is inclined with respect to both a tire width direction and a tire circumferential direction,
the maximum depth of the recessed region from the first edge to the base is not greater than 1.5 mm; and
the entire length in a depth direction of the second vertical face is greater than or equal to 0.5 mm but is less than or equal to 1.5 mm.

2. The pneumatic tire according to claim 1 wherein the entire length of the third edge as seen in a plan view is not less than 2 mm.

3. The pneumatic tire according to claim 1
wherein the third edge between the second vertical face and the higher one of the at least two planar regions is at an end to a first side of said one of the at least two planar regions in the prescribed direction, the said one of the at least two planar regions is inclined in such fashion as to cause a position of the third edge to be further toward an exterior in the tire radial direction than an end to a second side in the prescribed direction of said one of the at least two planar regions; and
wherein locations of adjacent planar regions of the at least two planar regions in the prescribed direction mutually overlap in the tire radial direction.

4. The pneumatic tire according to claim 1
wherein the recessed region has at least two first vertical faces; and
wherein at least one third edge, which is arranged at a first side in the width direction of the recessed region, and at least one third edge, which is arranged at a second side in the width direction of the recessed region, are inclined in different directions with respect to the prescribed direction as seen in a plan view.

5. The pneumatic tire according to claim 1 wherein a sipe is formed at a central region in the width direction of the recessed region.

\* \* \* \* \*